United States Patent [19]

Poorman

[11] Patent Number: 4,730,891
[45] Date of Patent: Mar. 15, 1988

[54] MULTIPLE-CHANNEL OPTICAL FIBER CONNECTOR ASSEMBLY

[75] Inventor: Thomas J. Poorman, Houston, Tex.

[73] Assignee: Western Atlas International, Inc., Houston, Tex.

[21] Appl. No.: 839,728

[22] Filed: Mar. 14, 1986

[51] Int. Cl.[4] ............................................. G02B 6/38
[52] U.S. Cl. ............................... 350/96.21; 350/96.18
[58] Field of Search .............. 350/96.15, 96.16, 96.18, 350/90.20, 96.21, 96.22

[56] References Cited

U.S. PATENT DOCUMENTS

| | | | |
|---|---|---|---|
| 3,846,010 | 11/1974 | Love et al. | 350/96.22 |
| 4,239,334 | 12/1980 | Johnson | 350/96.21 |
| 4,493,528 | 1/1985 | Shaw et al. | 350/96.15 |
| 4,501,468 | 2/1985 | Borelli et al. | 350/96.25 |
| 4,657,346 | 4/1987 | Berry et al. | 350/96.20 X |

FOREIGN PATENT DOCUMENTS 2126748 3/1984 United Kingdom ............ 350/96.15

OTHER PUBLICATIONS

Fiber Optic Couplers for Multiplexing Photonics Spectra, Apr. 1984.
NSG America Inc. Bulletin, SELFOC Micro Lenses.
Belden Cable Co., Innovator, Fiber-Optic Reprint Series, Jan. 1980.

Primary Examiner—John Lee
Assistant Examiner—Phan Heartney
Attorney, Agent, or Firm—William A. Knox; Barry C. Kane

[57] ABSTRACT

A unitary optical-fiber connector assembly accepts a plurality of input channels and, by means of a common transfer lens of the graded-index type, transfers the input-channel data to a corresponding plurality of optical-fiber output channels.

4 Claims, 4 Drawing Figures

MULTIPLE-CHANNEL OPTICAL FIBER CONNECTOR ASSEMBLY

FIELD OF THE INVENTION

This invention relates to optical couplers and connectors for use in connecting optical fibers to optical circuit boards and the like.

DESCRIPTION OF THE PRIOR ART

Optical networks, such as used for telemetry, voice communications and the like, may be conveniently interconnected by optical fibers. In some cases, optical power is coupled between fibers by evanescent couplers. Such couplers transfer a specified portion of the optical energy of one fiber to a second fiber. A typical coupler is described in U.S. Pat. No. 4,493,528 granted to H. J. Shaw.

In some applications, optical fibers are used in place of wires to interconnect a source of radiation such as an LED to some component such as a radiation-pulse detector. For that service, the optical fiber may be terminated by suitable male or female plugs that are capable of being mated with corresponding fittings mounted on the respective optical components. Typical of such connectors are the well-known SMA type connector or the Amphenol 906-113-5000 connector.

In all of the above styles of optical connector plugs, one matched-unit plug pair is required for every discrete optical-fiber line to be connected. Optical connectors are comparatively expensive. It would be economical of funds, hardware, and bulk if the number of individual connector plugs, associated with an optical network, could be reduced.

SUMMARY OF THE INVENTION

It is an object of this invention to provide a multi-channel optical-fiber connector assembly in a single connector plug having a single radiation transfer lens that is common to a plurality of separate optical fibers, rather than making use of a separate connector for each fiber.

In accordance with an aspect of this invention, the optical connector assembly includes a first connector half having an elongated, outer body and having front and back faces. A circular recess extends from the front face of the connector half, partially through the length thereof. A polygonal passageway extends from the back face of the connector half, forward to meet the circular recess and is axially aligned therewith. A graded-index transfer lens, mounted in a ferrule, is secured inside the circular recess. A plurality of optical fibers are secured in the corners of the polygonal passageway, the corners acting as vee-grooves. A central spacer, which may itself be another optical fiber, between the fibers wedges the fibers in place. The terminal ends of the fiber abut the inner surface of the graded-index transfer lens. The optical connector is keyed so that the front end of one connector half will mate with the front end of a second connector half and constrain the graded-index transfer lenses of the two connectors to remain in optical alignment but with a small separation between the respective graded-index transfer lenses. The second connector half is configured to be an optical mirror image of the first connector half.

BRIEF DESCRIPTION OF THE DRAWINGS

These and other objects and advantages of this invention may be gleaned from the appended Detailed Description and the drawings wherein.

DETAILED DESCRIPTION OF THE PREFERRED EMBODIMENT

The optical connector plug of this invention accepts optical information from a plurality of input optical channels, transfers the information across a common graded-index transfer lens to a like plurality of output channels. The configuration of the optical connector plug is considerably more compact than if the respective optical fibers comprising each channel had been terminated by individual connector plugs.

A graded-index lens has the property of converting a divergent beam of radiation from a small-area source to a parallel beam having a much larger area. That is, it acts as a collimator but without the need for complex lens curves. Spherical aberration is therefore absent. The optical characteristics of the lens depends upon its physical length and must be designed for a specific wave length such as 830 nm.

A pair of graded-index lenses may be used to couple two fibers. The input fiber abuts the input face of the first lens. Divergent light emanating from the input fiber is collimated as a parallel light beam of considerably greater cross section that leaves the output face of the first lens. A second lens, facing the first lens receives the collimated light and converges the parallel light beam into a second, output fiber. Because of the collimated beam, moderate misalignments of the graded-index lenses (hereinafter termed transfer lenses) are tolerable. Furthermore, small separations between a pair of transfer lenses of up to their full diameter are acceptable.

Figure 1:
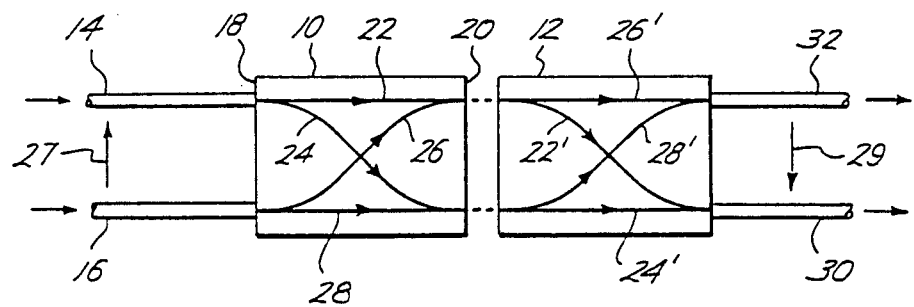
FIG. 1 schematically shows the ray paths of light beams passing through a multi-channel optical connector.

Refer now to FIG. 1 where there is shown two graded-index lenses 10 and 12. Input optical fibers 14 and 16 abut the input face 18 of lens 10, which has an output face 20. Radiation, such as a light beam, divergently emanating from fiber 14 is collimated as shown by rays 22 and 24. Similarly, for fiber 16, divergent rays 26 and 28 become parallel as they emerge from output face 20 of lens 10. Transfers lens 12 accepts the collimated light beams from transfer lens 10 along ray paths 22' and 24' and converges them into output fiber 30. In a similar manner, rays 26' and 28' are converged into output fiber 32. An object 27 as seen at the input, is inverted with respect to the image 29 as seen at the output. By suitable choice of transfer-lens parameters, an erect image at the output is possible.

From FIG. 1, it is seen that a single common transfer-lens pair can interconnect a plurality of separate optical-fiber channels. Two such fibers are shown in FIG. 1 by way of example, but four or more may be used depending upon the diameter of the transfer lens relative to that of the optical fibers.

The coupling efficiency as tested in the laboratory on a prototype was quite good: in the order of 1 dB or less.

Interchannel crosstalk was better than 30 dB down in terms of optical power.

In FIG. 1, the direction of propagation of the light beams is shown as being from left to right. Since transfer lenses 10 and 12 are mirror images of one another, the direction of light propagation could equally well be from right to left or the propagation direction in one set of fibers such as 14 and 30 could be opposite to the direction through fibers 16 and 32. Therefore, it is inappropriate to refer to the "input" and "output" faces of the lenses. Hereinafter, for reasons that will become apparent, the transfer-lens face that abuts the terminal ends of the fibers, such as 18, will be termed the inner face and the opposite end such as 20, will be termed the outer face.

Figure 2:
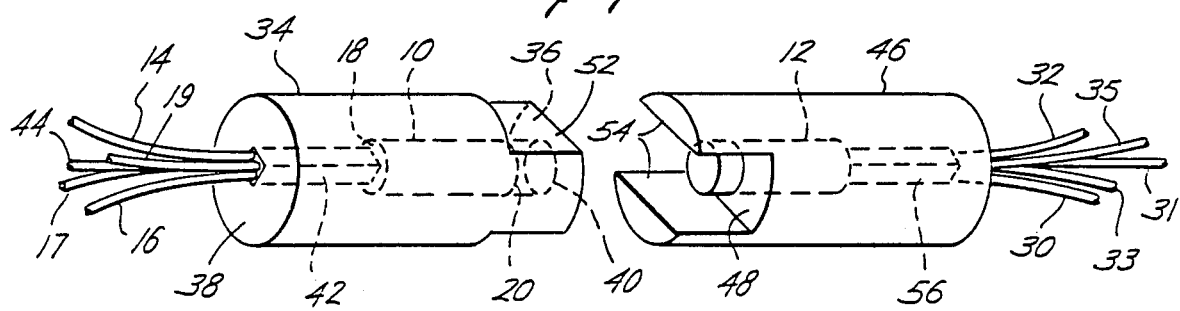
FIG. 2 is an isometric phantom diagram of the connector.
Figure 3:
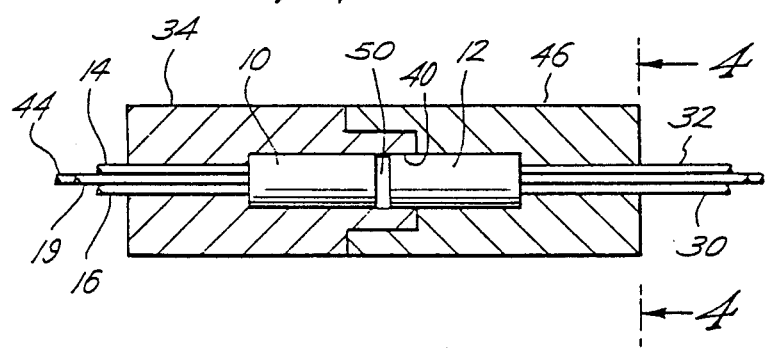
FIG. 3 is a longitudinal cross section through the connector.
Figure 4:
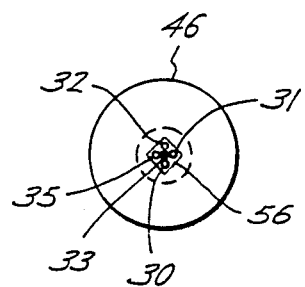
FIG. 4 is an end view of the connector.

FIGS. 2,3 and 4 show the construction of a prefered embodiment of a multiport optical connector plug assembly. The illustrations are exemplary only; many other designs could be devised by those skilled in the art.

FIG. 2 is a phantom, isometric view of a pair of mating optical connector halves. A first connector half consists of an elongated outer body 34, peferably but not necessarily circular, having a front end face 36 and back end face 38. The front end face 36 defines a circular recess 40. A polygonal passageway 42, which conveniently may be square, is provided that extends from the back end face 38 into the circular recess 40, in communication therewith, and in alignment. A graded-index transfer lens 10 is secured within recess 40. The outer surface 20 of lens 10 is set back a convenient distance from the front face 36 of connector body 34. The setback is defined to be equal to or more than the clear diameter of lens element 10, that is, the diameter of the graded-index transfer lens, less the thickness of the supporting ferrule. One purpose of the setback is to protect the lens face from harm.

A plurality of optical fibers such as 14,16,17 and 19 are inserted into polygonal passageway 42. The corners of the polygonal passageway serve as vee-grooves to accurately fix the location of the fibers. A central spacer 44 which may be another optical fiber, wedges the fibers in place against the vee-grooves. The respective fiber terminal ends are polished in the usual manner and are positioned to abut the inner surface 18 of lens 10. Index-matching paste may be used if desired. Once in place, the optical fibers may be epoxied permanently in the polygonal passageway.

A second connector plug 46 in FIG. 2 is constructed to be substantially an optical mirror image of first plug 34 except that the outer surface of transfer lens 12 may, but not necessarily, projects from the front face 48 of connector body 42 a little way. The term "a little way" is defined as a length equal to at least the clear diameter of the transfer lens 12. When mated, as in FIG. 3, transfer lens 12 fits into recess 40 to assure correct axial alignment with transfer lens 10, although as before discussed, alignment is not critical. When the outer plug bodies 34 and 46 are mated, as in FIG. 3, a small air space 50 separates transfer lenses 10 and 12. The purpose of lens separation is to prevent dirt from abrading the lens surfaces as would happen if the lens surface were in direct contact. The term "small" means a distance equal to at least half the diameter of the clear aperture of the lens.

Returning to FIG. 2, the outer connector bodies are keyed such as by the tongue 52 and groove 54 arrangement shown so that the mated connector halves remain in rotational alignment. Other keying arrangements are of course possible.

FIG. 4 is an end view of connector body 46 showing fibers 30,31,32,33 and spacer 35 arranged in polygonal passageway 56.

Outer bodies 34 and 46 may be made of injection-molded plastic of a type that is dimensionally stable after removal from the mold. FIGS. 2 and 3 show each of the bodies 34 and 46 to be made in one piece. Each one, may, however, be made in split-halves which are later secured together by any suitable means. The transfer lenses conveniently may be Selfoc micro lenses may be NSG America, Inc. of Clark, N.J. The optical fibers may be of any type useful for the service intended. When mated, two connector halves may be held in place by suitable detents built into the tongue-and-groove configuration or by means of threaded slip-nuts such as are employed with the well-known SMA connectors.

Many other design details may be contemplated by those skilled in the art but which will be included within the scope of this invention which is limited only by the appended claims.

The connector assembly could be configured as a duplex or triplex directional coupler by applying a dielectric reflective coating to the outer surface of the transfer lenses. The multiplicity depends upon the number of fibers that can be accomodated by the plug assembly.

I claim as my invention:

1. A multi-channel optical-fiber connector assembly, comprising:
   a first connector half;
   said first connector half including an elongated body having front and back surfaces, a circular recess extending longitudinally from said front surface partially through said elongated body, a polygonal passageway, having internal corners, extending from said back surface to communicate with said circular recess in axial alignment therewith;
   a common transfer lens having inner and outer surfaces, mounted in said circular recess, said outer surface being set back from the front surface of said elongated body;
   a plurality of optical fibers, having terminal ends, mounted in said polygonal passageway, the terminal ends abutting said inner surface of said common transfer lens;
   means for wedging said optical fibers into the vee-grooves formed by the corners of said polygonal passageway;
   a second connector half, optically configured as a mirror image of said first connector half; and
   means for mating said first and second connector halves so as to axially align said connector halves and to allow a small separation between the outer surfaces of the common transfer lenses that are secured in the respective connector halves.

2. The multi-channel connector assembly as defined by claim 1, wherein the outer surface of the common transfer lens of said first connector halve projects a little way from the front surface of the elongated body thereof, for partial insertion into the circular recess of said second mating connector half.

3. The multi-channel connector assembly as defined by claim 2, further comprising:
   means for keying said first and second connector halves to maintain said connector halves in rotational alignment.

4. The optical-fiber connector assembly as defined by claim 3, wherein:
   said means for wedging is itself an optical fiber.

* * * * *